United States Patent
Matsumoto et al.

(10) Patent No.: US 7,081,499 B2
(45) Date of Patent: Jul. 25, 2006

(54) ELECTRICAL INSULATING MATERIAL AND METHOD FOR FASTENING A SHAPED BODY

(75) Inventors: Naomi Matsumoto, Otsu (JP); Hitoshi Ueno, Otsu (JP); Yasuhiro Nishihara, Otsu (JP); Hirota Nagano, Otsu (JP)

(73) Assignee: Toyo Boseki Kabushiki Kaisha, Osaka (JP)

( * ) Notice: Subject to any disclaimer, the term of this patent is extended or adjusted under 35 U.S.C. 154(b) by 48 days.

(21) Appl. No.: 10/115,287

(22) Filed: Apr. 4, 2002

(65) Prior Publication Data

US 2003/0162040 A1   Aug. 28, 2003

Related U.S. Application Data

(63) Continuation of application No. PCT/JP02/01585, filed on Feb. 22, 2002.

(30) Foreign Application Priority Data

Mar. 16, 2001  (JP) ............... 2001-076497

(51) Int. Cl.
*C08L 53/00*  (2006.01)
*C08L 67/00*  (2006.01)
*C08L 67/02*  (2006.01)
*H01B 3/18*   (2006.01)
*H01B 3/28*   (2006.01)

(52) U.S. Cl. .............. 525/165; 525/88; 525/92 F; 525/89; 525/93; 525/94; 525/98; 525/99; 525/173; 525/174; 525/176; 174/137 R; 174/138 C; 174/137 B

(58) Field of Classification Search .......... 428/480, 428/458, 457, 461; 525/88, 92 R, 92 A, 525/92 B, 92 F, 92 L, 89, 90, 94, 95, 96, 525/97, 98, 99, 165, 173, 174
See application file for complete search history.

(56) References Cited

U.S. PATENT DOCUMENTS

| | | | | |
|---|---|---|---|---|
| 4,373,063 A | * | 2/1983 | Sakano et al. | 525/64 |
| 4,671,896 A | * | 6/1987 | Hasegawa et al. | 523/210 |
| 4,775,712 A | * | 10/1988 | Sasaki et al. | 524/504 |
| 4,918,127 A | * | 4/1990 | Adur et al. | 524/415 |
| 4,918,132 A | * | 4/1990 | Hongo et al. | 524/504 |
| 4,945,191 A | * | 7/1990 | Satsuka et al. | 174/69 |
| 5,149,589 A | * | 9/1992 | Naritomi et al. | 428/412 |
| 5,166,267 A | * | 11/1992 | Cohn et al. | 525/177 |
| 5,381,097 A | * | 1/1995 | Takatori et al. | 324/512 |

(Continued)

FOREIGN PATENT DOCUMENTS

JP    02-288017    * 11/1990

(Continued)

*Primary Examiner*—Vivian Chen
(74) *Attorney, Agent, or Firm*—Kenyon & Kenyon LLP

(57) ABSTRACT

An electrical insulating material for use in electrical insulators, for example, for insulated electric wires such as internal wiring of electronic equipment, automobiles or the like, electrical insulating covers produced from the electrical insulating material and a method of electrical insulation using the material are provided. More particularly, it relates to an electrical insulating material which is excellent in mechanical properties and durability, an electrical insulating cover produced from the material and a method of electrical insulation using the material.

12 Claims, 1 Drawing Sheet

U.S. PATENT DOCUMENTS

| | | | |
|---|---|---|---|
| 5,502,095 A * | 3/1996 | Ueshima et al. | 524/269 |
| 5,550,190 A * | 8/1996 | Hasegawa et al. | 525/92 A |
| 5,728,772 A * | 3/1998 | Hori et al. | 525/92 B |
| 5,936,037 A * | 8/1999 | Tasaka | 525/92 B |
| 6,037,423 A * | 3/2000 | Nagano et al. | 525/438 |
| 6,064,002 A * | 5/2000 | Hayami et al. | 174/52.1 |
| 6,242,097 B1 * | 6/2001 | Nishiguchi et al. | 428/383 |

FOREIGN PATENT DOCUMENTS

| | | |
|---|---|---|
| JP | A 194-240116 | 8/1994 |
| JP | A 1994-228419 | 8/1994 |
| JP | A 1995-53785 | 2/1995 |
| JP | A 2000-100253 | 4/2000 |
| JP | A 2000-228120 | 8/2000 |

* cited by examiner

US 7,081,499 B2

ELECTRICAL INSULATING MATERIAL AND METHOD FOR FASTENING A SHAPED BODY

CROSS REFERENCE TO RELATED APPLICATIONS

This application is a continuation of PCT/JP02/01585, filed Feb. 22, 2002, which claims priority to JP 2001-76497, filed Mar. 16, 2001.

FIELD OF THE INVENTION

The present invention relates to an electrical insulating material for use in electrical insulators, for example, for insulated electric wires such as internal wiring of electronic equipment, automobiles or the like, electrical insulating covers produced from the electrical insulating material and a method of electrical insulation using the material. The invention more particularly relates to an electrical insulating material which is excellent in mechanical properties and durability, an electrical insulating cover produced from the material and a method of electrical insulation using the material.

The invention also relates to a fastening method and a fastening member for fastening a shaped body containing a polyester resin, and more particularly to a fastening method and a fastening member wherein even when a shaped body prepared from a polyester resin and to be used under a high temperature environment is fixed, a thermoplastic polyester elastomer is scarcely deteriorated. Further the invention relates to a fastening method and a fastening member wherein an electrical insulating material becomes scarcely degraded even under an environment of high temperature exceeding 120° C.

The invention also concerns with a fastening method and a fastening member for☐fastening a shaped body made of an electrical insulating material for use in electrical insulators for insulated electric wires such as internal wiring of electronic equipment, automobiles or the like. More particularly, the invention concerns with a fastening method and a fastening member wherein even when a shaped body to be used under a high temperature environment is fixed, the electrical insulating material is scarcely degraded.

BACKGROUND OF THE INVENTION

Electrical insulating materials for use in electric wires used in internal wiring of electronic equipment, automobiles or the like require various properties including electrical insulation properties such as dielectric strength; mechanical properties such as tensile properties, and abrasion resistance; flexibility; flame retardancy; heat resistance; cold resistance, etc.

Compositions containing vinyl chloride resins or olefin resins as main components have been used as electrical insulating materials superior in such electrical properties, mechanical properties and like properties.

However, other resins are increasingly used in recent years in place of vinyl chloride resins which raise environmental problems. Further, olefin resins are difficult to use under high temperature environments because of low heat resistance.

Attention is drawn nowadays to thermoplastic polyesters having high heat resistance and recyclability as an electrical insulating material, beside that the resin is thermoplastic. Among them, thermoplastic polyester elastomers having high elastomeric properties are widely used as a wire-coating material for its flexibility.

Among them, a polymer produced by reacting an aromatic polyester with a lactone is suitable for use under a high temperature environment such as an automobile engine room because of its high heat resistance. Especially a thermoplastic polyester elastomer containing 20 to 40% by weight of a polylactone segment has flexibility suitable as a wire-coating material.

Known methods of producing polymers by reacting an aromatic polyester with a lactone include a method comprising reacting a crystalline aromatic polyester with a lactone (Japanese Publication of Examined Application No. 4116/1973), a method comprising reacting a crystalline aromatic polyester with a lactone and reacting the obtained block initial copolymer with a polyfunctional acylating agent to give a chain extension (Japanese Publication of Examined Application No. 4115/1973), and a method comprising polymerizing a lactone in a state of solid phase in the presence of a crystalline aromatic polyester (Japanese Publication of Examined Application No. 49037/1977), etc.

Electric wires formed using the polymer obtained by these methods as an electrical insulating material have a drawback of becoming locally degraded and of losing the electrical insulating properties when subjected to water resistance and dielectric breakdown test called "Hot Water Resistance Test" among the test methods according to SAE J1678. This phenomenon is likely to occur especially when an electrical insulating layer is thin and an electric wire is connected to the anode of direct current power source. For this reason, it is difficult to commercially use these polymers as an electrical insulating material, e.g. for electric wires under an environment in which the polymer is affected by water.

Further, the foregoing shaped body when actually used may be fastened with a screw, bolt, nut, adhesive, tape, cord, film, hook or the like in order to position the shaped body according to the purpose, or to prevent contact with other material or to inhibit dispersing.

When the shaped body is fastened, problems would be posed. The degradation of shaped body may be promoted under an influence of environmental conditions (temperature, humidity) depending on a combination of a material for a fastening member with a material for a shaped body. For example, the physical strength may be markedly reduced at a portion of the shaped body in contact with the fastening member. Especially the degradation problem becomes noticeable at a high temperature exceeding 80° C. and a high humidity in the equipment or apparatus even when no problem may be raised under an ordinary environment. Such shaped body can not be used under severe conditions.

SUMMARY OF THE INVENTION

The first object of the present invention is to provide a material which is improved in electrical properties while retaining the advantages (heat resistance, flexibility, chemical resistance, etc.) of usual thermoplastic polyester elastomers; especially electrical insulating material which achieves high water resistance and electrical insulating properties in "Hot Water Resistance Test" according to SAE J1678; an electrical insulating cover produced from the electrical insulating material; use of the material as an electrical insulating material and; a method of electrical insulation using the material.

The second object of the invention is to provide a method of fastening a shaped body containing a polyester resin wherein under high temperature and humidity environments, especially under an environment of a high temperature exceeding 120° C., the shaped body and the fastening member do not affect each other in respect of properties. In other words, it is the second object of the invention to provide a method of fastening a shaped body containing a polyester resin, and a combination of a material for a shaped body and a material for a fastening member, these materials being unlikely to affect each other in properties under high temperature and humidity environments, especially under an environment of high temperature exceeding 120° C.

The third object of the invention is to provide a fastening method and fastening member such that when fixing a shaped body formed from a material showing high water resistance and electrical insulating properties in "Hot Water Resistance Test" according to SAE J1678, the shaped body can retain its excellent properties for a long time even under a high temperature environment.

The inventors of the present invention conducted extensive research to achieve the foregoing objects, and obtained the findings i) to iii) given below.

When 1 to 30 parts by weight of a rubber-like polymer is used per 100 parts by weight of a thermoplastic polyester elastomer, the water resistance and the electrical insulating properties can be improved while retaining properties such as the heat resistance, flexibility and chemical resistance of thermoplastic polyester elastomer. When the resulting composition is used as a material for an electrical insulator, the insulator can retain its excellent electrical insulating properties without its degradation under an environment under which it is affected by water.

When fastening a shaped body containing a polyester resin, especially thermoplastic polyester elastomer, Zn present in a material for the fastening member would migrate to the shaped body and would act as a catalyst, resulting in accelerated degradation of the shaped body and significantly lowered its physical strength. When the Zn content in the fastening member is 1% by weight or less, the degradation of shaped body is suppressed without posing any practical problem.

A molded product may be degraded due to thermal oxidation at a high temperature depending on a combination of a material for fastening member with a material for the molded product. Especially when Pb exists in the fastening material, it would migrate to the molded product of polyester and would act as a catalyst, accelerating the degradation of the molded product and markedly reducing its physical strength. The degradation of molded product would be suppressed without posing a practical problem by adjusting the Pb content to 0.03% by weight or less in the fastening member.

The present invention was completed by making further investigations based on the foregoing findings and provide electrical insulating materials, methods of fastening shaped bodies and the like described below in respective items.

An electrical insulating material comprising 100 parts by weight of a thermoplastic polyester elastomer (A) and 1 to 30 parts by weight of a rubber-like polymer (B).

The electrical insulating material as defined in item 1, wherein the thermoplastic polyester elastomer (A) is a polyester-type block copolymer comprising a crystalline aromatic polyester segment and a polylactone segment.

The electrical insulating material as defined in item 2, wherein the thermoplastic polyester elastomer (A) contains 20 to 40% by weight of the polylactone segment.

The electrical insulating material as defined in item 1, 2 or 3, wherein the rubber-like polymer (B) is at least one material selected from the group consisting of natural rubber, polyisoprene, cis-1,4-polybutadiene, styrene-butadiene copolymer rubber, ethylene-propylene rubber, chloroprene rubber, butyl rubber, halogenated butyl rubber, acrylonitrile-butadiene copolymer rubber, acrylic rubber, and derivatives thereof.

An electrical insulating cover comprising 100 parts by weight of a thermoplastic polyester elastomer (A) and 1 to 30 parts by weight of a rubber-like polymer (B).

The electrical insulating cover as defined in item 5, wherein the thermoplastic polyester elastomer (A) is a polyester-type block copolymer comprising a crystalline aromatic polyester segment and a polylactone segment.

The electrical insulating cover as defined in item 6, wherein the thermoplastic polyester elastomer (A) contains 20 to 40% by weight of the polylactone segment.

The electrical insulating cover as defined in item 5, 6 or 7, wherein the rubber-like polymer (B) is at least one material selected from the group consisting of natural rubber, polyisoprene, cis-1,4-polybutadiene, styrene-butadiene copolymer rubber, ethylene-propylene rubber, chloroprene rubber, butyl rubber, halogenated butyl rubber, acrylonitrile-butadiene copolymer rubber, acrylic rubber, and derivatives thereof.

A method of electrical insulation using a shaped body comprising 100 parts by weight of a thermoplastic polyester elastomer (A) and 1 to 30 parts by weight of a rubber-like polymer (B).

The method as defined in item 9, wherein the thermoplastic polyester elastomer (A) is a polyester-type block copolymer comprising a crystalline aromatic polyester segment and a polylactone segment.

The method as defined in item 10, wherein the thermoplastic polyester elastomer (A) contains 20 to 40% by weight of the polylactone segment.

The method as defined in item 9, 10 or 11, wherein the rubber-like polymer (B) is at least one material selected from the group consisting of natural rubber, polyisoprene, cis-1,4-polybutadiene, styrene-butadiene copolymer rubber, ethylene-propylene rubber, chloroprene rubber, butyl rubber, halogenated butyl rubber, acrylonitrile-butadiene copolymer rubber, acrylic rubber, and derivatives thereof.

Use of a composition as an electrical insulating material, the composition comprising 100 parts by weight of a thermoplastic polyester elastomer (A) and 1 to 30 parts by weight of a rubber-like polymer (B).

The use as defined in item 13, wherein the thermoplastic polyester elastomer (A) is a polyester-type block copolymer comprising a crystalline aromatic polyester segment and a polylactone segment.

The use as defined in item 14, wherein the thermoplastic polyester elastomer (A) contains 20 to 40% by weight of the polylactone segment.

The use as defined in item 13, 14 or 15, wherein the rubber-like polymer (B) is at least one material selected from the group consisting of natural rubber, polyisoprene, cis-1, 4-polybutadiene, styrene-butadiene copolymer rubber, ethylene-propylene rubber, chloroprene rubber, butyl rubber, halogenated butyl rubber, acrylonitrile-butadiene copolymer rubber, acrylic rubber, and derivatives thereof.

A method of fastening a shaped body formed from a material containing a polyester resin using a fastening member containing 1% by weight or less of Zn at least at a portion of the fastening member in contact with the shaped body.

The method as defined in item 17, wherein the material containing a polyester resin comprises 100 parts by weight of thermoplastic polyester elastomer (A) and 1 to 30 parts by weight of a rubber-like polymer (B).

The method as defined in item 18, wherein the thermoplastic polyester elastomer (A) is a polyester-type block copolymer comprising a crystalline aromatic polyester segment and a polylactone segment.

The method as defined in item 19, wherein the thermoplastic polyester elastomer (A) contains 20 to 40% by weight of the polylactone segment.

The method as defined in item 18, 19 or 20, wherein the rubber-like polymer (B) is at least one material selected from the group consisting of natural rubber, polyisoprene, cis-1, 4-polybutadiene, styrene-butadiene copolymer rubber, ethylene-propylene rubber, chloroprene rubber, butyl rubber, halogenated butyl rubber, acrylonitrile-butadiene copolymer rubber, acrylic rubber, and derivatives thereof.

The method as defined in any one of items 17 to 21, wherein the fastening member is a tape.

A method of fastening a shaped body formed from a material containing a polyester resin using a fastening member containing 0.03% by weight or less of Pb at least at a portion of the fastening member in contact with the shaped body.

The method as defined in item 23, wherein the material containing a polyester resin comprises 100 parts by weight of a thermoplastic polyester elastomer (A) and 1 to 30 parts by weight of a rubber-like polymer (B).

The method as defined in item 24, wherein the thermoplastic polyester elastomer (A) is a polyester-type block copolymer comprising a crystalline aromatic polyester segment and a polylactone segment.

The method as defined in item 25, wherein the thermoplastic polyester elastomer (A) contains 20 to 40% by weight of the polylactone segment.

The method as defined in item 24, 25 or 26, wherein the rubber-like polymer (B) is at least one material selected from the group consisting of natural rubber, polyisoprene, cis-1, 4-polybutadiene, styrene-butadiene copolymer rubber, ethylene-propylene rubber, chloroprene rubber, butyl rubber, halogenated butyl rubber, acrylonitrile-butadiene copolymer rubber, acrylic rubber, and derivatives thereof.

The method as defined in any one of items 23 to 27, wherein the fastening member is a tape.

A fastening member for fastening a shaped body prepared from a material containing a polyester resin, the fastening member containing 1% by weight or less of Zn at least at a portion of the fastening member in contact with the shaped body.

The fastening member as defined in item 29, wherein the material containing a polyester resin comprises 100 parts by weight of a thermoplastic polyester elastomer (A) and 1 to 30 parts by weight of a rubber-like polymer (B).

The fastening member as defined in item 30, wherein the thermoplastic polyester elastomer (A) is a polyester-type block copolymer comprising a crystalline aromatic polyester segment and a polylactone segment.

The fastening member as defined in item 31, wherein the thermoplastic polyester elastomer (A) contains 20 to 40% by weight of the polylactone segment.

The fastening member as defined in item 30, 31 or 32, wherein the rubber-like polymer (B) is at least one material selected from the group consisting of natural rubber, polyisoprene, cis-1,4-polybutadiene, styrene-butadiene copolymer rubber, ethylene-propylene rubber, chloroprene rubber, butyl rubber, halogenated butyl rubber, acrylonitrile-butadiene copolymer rubber, acrylic rubber, and derivatives thereof.

The fastening member as defined in any one of items 29 to 33 which is a tape.

A fastening member for fastening a shaped body formed from a material containing a polyester resin, the fastening member containing 0.03% by weight or less of Pb at least at a portion of the fastening member in contact with the shaped body.

The fastening member as defined in item 35, wherein the material containing a polyester resin comprises 100 parts by weight of a thermoplastic polyester elastomer (A) and 1 to 30 parts by weight of a rubber-like polymer (B).

The fastening member as defined in item 36, wherein the thermoplastic polyester elastomer (A) is a polyester-type block copolymer comprising a crystalline aromatic polyester segment and a polylactone segment.

The fastening member as defined in item 37, wherein the thermoplastic polyester elastomer (A) contains 20 to 40% by weight of the polylactone segment.

The fastening member as defined in item 36, 37 or 38, wherein the rubber-like polymer (B) is at least one material selected from the group consisting of natural rubber, polyisoprene, cis-1,4-polybutadiene, styrene-butadiene copolymer rubber, ethylene-propylene rubber, chloroprene rubber, butyl rubber, halogenated butyl rubber, acrylonitrile-butadiene copolymer rubber, acrylic rubber, and derivatives thereof.

The fastening member as defined in any one of items 35 to 39 which is a tape.

DETAILED DESCRIPTION OF THE INVENTION

Figure 1:
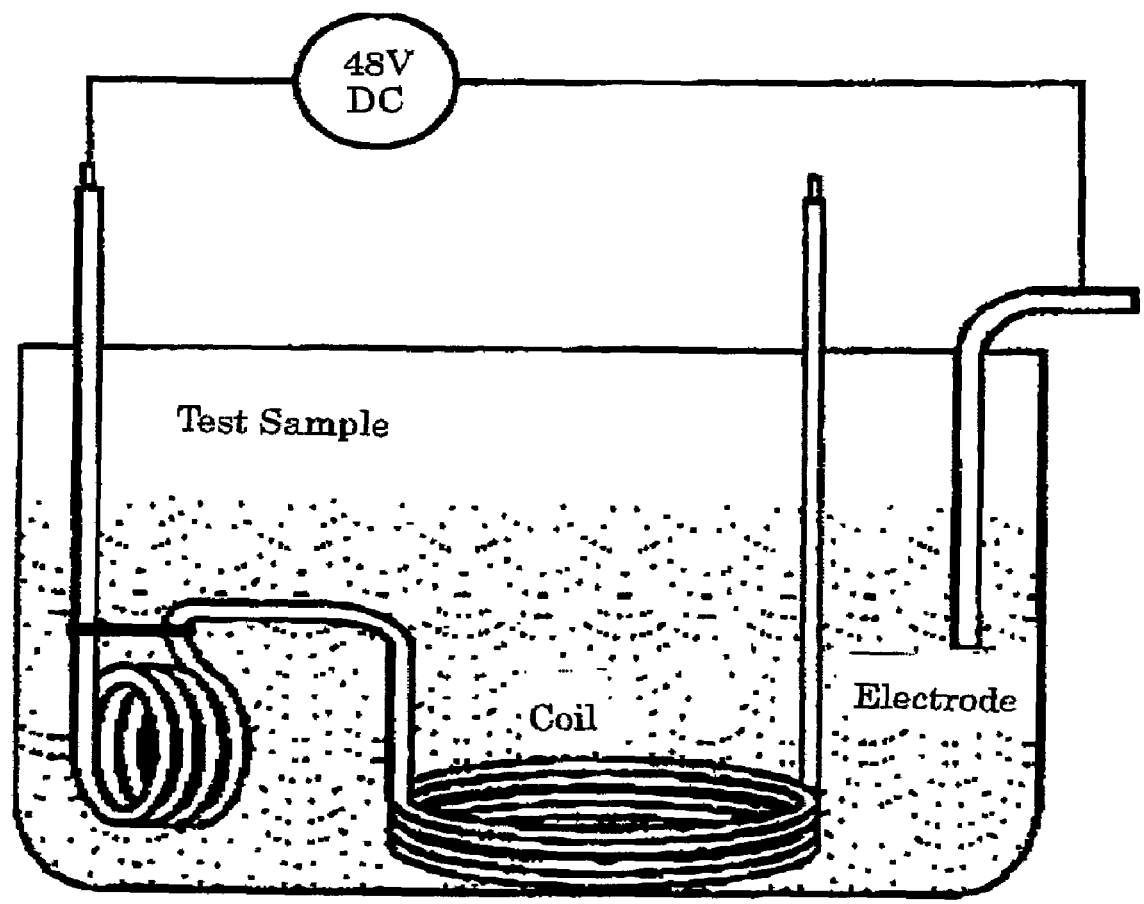
FIG. 1 shows a test apparatus for evaluating electrical insulating property.

Electrical Insulating Material
Basic Structure

The electrical insulating material of the invention comprises 100 parts by weight of a thermoplastic polyester elastomer (A) and 1 to 30 parts by weight of a rubber-like polymer (B).

Thermoplastic Polyester Elastomer (A)
2-1) Basic Structure

The thermoplastic polyester elastomer to be used in the invention is a copolymer (polyester-type block copolymer) consisting of a high-melting point polyester segment having an aromatic ring (crystalline aromatic polyester, also called hard segment) and a low-melting point polymer segment (also called soft segment). Preferably a polymer consisting of the constituents of the hard segment has a melting point of 180° C. or higher, and a polymer consisting of the constituents of the soft segment has a melting point or softening point of 80° C. or lower.

The thermoplastic polyester elastomer will be described in greater detail. Examples of constituents of the hard segment are terephthalic acid, isophthalic acid, diphenyldicarboxylic acid, 5-sodium sulfoisophthalate, 2,6-naphthalenedicarboxylic acid, 1,5-naphthalenedicarboxylic acid, 1,4-naphthalenedicarboxylic acid and like aromatic dicarboxylic acids or esters thereof, glycol having about 1 to about 25 carbon atoms and their ester-forming derivatives.

As an acid component among the hard segment constituents, the above-exemplified aromatic dicarboxylic acids or esters thereof can be used either alone or in combination.

When the acid components are used in combination, terephthalic acid or naphthalenedicarboxylic acid is used in an amount of 60 mole % or more, preferably 70 mole % or more, of the total amount of acid components.

Examples of the glycol having about 1 to about 25 carbon atoms are ethylene glycol, diethylene glycol, propylene glycol, 1,3-butanediol, 1,4-butanediol, 1,5-pentanediol, 1,6-hexanediol, 1,9-nonandiol, neopentyl glycol, dimethylol heptane, dimethylol pentane, tricyclodecane dimethanol, bisphenol X ethylene oxide derivative (X is A, S or F) and their ester-forming derivatives. They can be used either alone or in combination. It is preferred to use ethylene glycol, 1,4-butanediol and their ester-forming derivatives.

The hard segment has a number average molecular weight of about 300 to about 8,000, preferably about 500 to about 5,000.

Examples of the soft segment are poly(ethylene oxide) glycol, poly(propylene oxide)glycol, poly(tetramethylene oxide)glycol and like polyalkylene ether glycols. These examples can be used either alone or in combination. Examples of the low-melting point polymer segment include, for example, copolymers of polyether glycol prepared by copolymerizing at least two kinds of constituent units of the polyalkylene ether glycol. Examples of the low-melting point polymer segment also include, for example, polyester consisting of aliphatic or alicyclic dicarboxylic acid having about 2 to about 12 carbon atoms, and aliphatic or alicyclic glycol having about 2 to about 12 carbon atoms, preferably about 4 to about 10 carbon atoms. Examples of such polyesters are polyethylene adipate, polytetramethylene adipate, polyethylene sebacate, polyneopentyl sebacate, polytetramethylene dodecanate, polytetramethylene azelate, polyhexamethylene azelate and like aliphatic polyesters. They may be aliphatic polyester prepared using at least 2 kinds of dicarboxylic acids and/or at least 2 kinds of glycols.

Further, useful soft segments include, for example, polylactone prepared by polymerizing or copolymerizing caprolactone, enanlactone, caprylolactone and/or like lactones. Among them, polylactone is preferred, and caprolactone is more preferred as the low-melting point segment in view of heat resistance and resistance to high wet heat.

Among the above-mentioned thermoplastic polyester elastomer compositions, it is preferred in the invention to use those comprising 100 parts by weight of a polyester-type block copolymer prepared by reacting a crystalline aromatic polyester with a lactone and 1 to 30 parts by weight of a rubber-like polymer.

The polyester-type block copolymer to be used in preparing the composition of the invention itself is known and can be prepared by reacting a crystalline aromatic polyester with a lactone.

2-2) Crystalline Aromatic Polyester

Preferred examples of the crystalline aromatic polyester are polyethylene terephthalate, polytetramethylene terephthalate, poly-1,4-cyclohexylenedimethylene terephthalate, polyethylene-2,6-naphthalate, polybutylene-2,6-naphthalate and like homopolyesters; polyethyleneoxybenzoate, poly-p-phenylenebisoxyethoxy terephthalate and like polyester ethers; copolymer polyesters or copolymer polyester ethers mainly comprising tetramethylene terephthalate unit or ethylene terephthalate unit, and also comprising copolymer components such as tetramethylene or ethylene isophthalate unit, tetramethylene or ethylene adipate unit, tetramethylene or ethylene sebacate unit, 1,4-cyclohexylene dimethylene terephthalate unit, or tetramethylene or ethylene-p-oxybenzoate unit.

It is preferred to use polyethylene terephthalate, polytetramethylene terephthalate, polyethylene-2,6-naphthalate, polybutylene-2,6-naphthalate and the like. It is more preferred to use polytetramethylene terephthalate, polybutylene-2,6-naphthalate and the like. When the crystalline aromatic polyester is a copolymer, the crystalline aromatic polyester preferably contains 60 mole % or more, specially 70 mole % or more, of at least one kind of units of polyethylene terephthalate, polytetramethylene terephthalate, polyethylene-2,6-naphthalate, and polybutylene-2,6-naphthalate.

2-3) Lactone

Useful lactones include, for example, caprolactone, enanlactone and caprylolactone. These lactones can be used either alone or in combination. Especially caprolactone is preferred.

2-4) Proportions of Copolymer Components

The proportions of crystalline aromatic polyester and lactone as copolymer components are variable according to the purpose of the copolymer. Generally as the proportion of crystalline aromatic polyester increases, the obtained composition becomes harder and is more enhanced in the mechanical properties such as strength and ductility. On the other hand, generally, the increase in the proportion of lactone softens the obtained composition and improves the low-temperature properties. Consequently the proportions of the two copolymer components can be selected according to the purpose in view of the balance of mechanical strength and low-temperature properties. Typical proportions (weight ratio) of the components, i.e. aromatic polyester/lactone, are preferably 97/3 to 5/95, more typically not less than 95/5, especially not less than 80/20, not more than 30/70, especially not more than 60/40.

Rubber-Like Copolymer (B) 3-1) Basic Structure

Desirable rubber-like polymers to be used in the invention are those which are thermoplastic or non-crosslinked and which are unlikely to quickly decompose or thermally non-crosslinkable in molding operation (at least at 150° C. or higher), although not limited thereto.

Examples of the rubber-like polymer include a di-or multi-block copolymer comprising polyethylene, polypropylene or like crystalline polyolefin segment and non-crystalline segment, i.e. thermoplastic polyolefin elastomer.

Examples of the non-crystalline segment are vinyl acetate-methyl acrylate-ethyl acrylate copolymer, ethylene-propylene copolymer, ethylene-butene copolymer, copolymer composed of ethylene-propylene and a compound having a conjugated double bond (e.g., 1,3-butadiene, isoprene or chloroprene) (so-called EPDM), and segments obtained by combining these compolymers.

Further examples of the rubber-like polymer are thermoplastic styrene elastomers which are a copolymer composed of styrene and 1,3-butadiene, isoprene or chloroprene, ethylene-propylene copolymer (EPM), copolymer composed of ethylene, propylene or like α-olefin and 1,3-butadiene, isoprene or chloroprene (EPDM), copolymer composed of acrylonitrile and 1,3-butadiene, isoprene or chloroprene, polybutadiene, polyisoprene, chloroprene rubber, butyl rubber and like diene rubbers, polyurethane rubber, acrylic rubber, etc.

Other examples of the rubber-like copolymer include those composed by addition of part of the above-exemplified thermoplastic polyolefin elastomers or diene rubber with hydrogen or hydrogen oxide; optional mixtures of the above-exemplified polymers; and optional copolymers composed of monomers constituting the above-exemplified polymers.

Preferred examples of the rubber-like polymer are natural rubber, polyisoprene, cis-1,4-polybutadiene, styrene-butadiene copolymer rubber, ethylene-propylene rubber, chloroprene rubber, butyl rubber, halogenated butyl rubber, acrylonitrile-butadiene copolymer rubber, acrylic rubber, rubber comprising any of these rubbers as the main component and produced by copolymerizing other monomers at a ratio of 20 mole % or less. These rubbers can be used either alone or in combination.

Among them, it is preferred to use a thermoplastic polyolefin elastomer having no unsaturated bond, i.e. a rubber-like polymer which does not lower the resistance to thermal aging of thermoplastic polyester elastomer serving as the base. Preferable examples of such elastomers are ethylene-propylene copolymer and ethylene-butene copolymer. More preferable is a thermoplastic polyolefin elastomer which is modified with maleic acid or like acids, the elastomer being excellent in compatibility with thermoplastic polyester elastomer serving as the base.

3-2) Proportion of Combination

The proportion of the rubber-like polymer is variable with the required properties of the finally obtained composition, and is preferably about 1 to about 30 parts by weight, more preferably about 5 to about 20 parts by weight, per 100 parts by weight of the thermoplastic polyester elastomer which does not markedly lower the resistance to thermal aging of thermoplastic polyester elastomer serving as the base.

Other Components

The thermoplastic polyester elastomer composition of the invention may contain a flame retardant when so required. When a flame retardant is added in an amount not exceeding 100 parts by weight per 100 parts by weight of the polyester-type block copolymer, the composition to be used in the invention can be improved in flame retardancy. Examples of flame retardants are organic additives such as halogen additive, phosphorus additive and melamine additive, and inorganic additives such as metal hydroxides. Optionally the composition to be used herein may contain a flame retardant assistant such as antimony oxide, boron compound and the like.

The composition of the invention may contain other additives according to the use and purposes. Examples of such additives are conventional crystallization accelerators, crystal neucleus materials, antioxidants, UV absorbents, plasticizers, lubricants, antistatic agents, electrical conductivity improvers, hydrolysis resistance improvers, polyfunctional crosslinking agents, impact resistance improvers, metal degradation inhibitors, coloring agents, etc. The composition of the invention may be blended with other kinds of resin such as polyester, polyamide, polyolefin and/or polyurethane.

Process for Preparing an Electrical Insulating Material

The process for preparing an electrical insulating material according to the invention is not limited and an optional process can be employed. For example, the contemplated electrical insulating material can be obtained by heating and kneading the components by an extruder, a roll mill, Banbury type mixer or the like.

Method of Using an Electrical Insulating Material/Electrical Insulating Cover

The electrical insulating material of the invention can be suitably used as a material for a molded product such as an electrical insulating cover. The electrical insulating cover of the invention is used as coatings on electric wires, coverings for plugs, outlets and terminals, molded products as breakers, switches, electric appliances and apparatus, etc. and includes a wide range of materials intended for electrical insulation. Among them, the electrical insulating material of the invention is used, preferably as molding material for coatings on electric wires, coverings for plugs, outlets or terminals, most preferably as molding material for coatings on electric wires. These molded products can be made by injection molding, extrusion molding or the like. For example, coated electric wires are produced by extruding the material around the electric wire (core wire) by an extruder, whereby an electric wire covered with an electrical insulating cover can be obtained.

Effect

A shaped body which is excellent in mechanical strength, heat resistance and water resistance and in electrical insulating properties can be produced by using the electrical insulating material of the invention.

Namely the electrical insulating material of the invention can be advantageously used even under high temperature and high humidity environments.

Method of fastening a shaped body produced from a material containing a polyester resin Basic Structure The first fastening method of the invention is conducted to fasten a shaped body produced from a material containing a polyester resin using a fastening member or fastening jig containing 1% by weight or less of Zn at least at a portion of the fastening member or jig in contact with the shaped body.

The second fastening method of the invention is conducted to fasten a shaped body produced from a material containing a polyester resin using a fastening member or fastening jig containing 0.03% by weight or less of Pb at least at a portion of the fastening member or jig in contact with the shaped body.

First Fastening Method 2-1) Material of Shaped Body 2-1-1) Basic Structure of Material The molded product to be fixed by the first fixing method of the invention is one containing a polyester resin, suitably one containing a thermoplastic polyester elastomer.

2-1-2) Thermoplastic Polyester Elastomer

The thermoplastic polyester elastomer to be used in the shaped body to be fastened is as described in (I), 2).

2-1-3) Rubber-Like Polymer

The shaped body to be fastened in the invention may contain a rubber-like polymer in addition to the thermoplastic polyester elastomer. The amount of the rubber-like polymer to be used is preferably about 1 to about 30 parts by weight per 100 parts by weight of the thermoplastic polyester elastomer.

The kind of the rubber-like polymer is as described in (I), 3-1). The amount of the rubber-like polymer in the material of shaped body is as described in (I), 3-2).

2-1-4) Other Components

The other components in the material of shaped body in the method of the invention are as described in (I), 4).

2-1-5) Process for Preparing the Composition

The process for preparing the composition of the invention is as described in (I), 5).

2-2) Shaped Body

Using the obtained composition, a shaped body can be obtained by a usual molding method (injection molding, extrusion molding, blow molding, etc.). Preferred examples of the shaped body of the invention are conduit, retentioning wire coatings, optical fiber coatings, hoses and like cord-like moldings, sheet-like products, containers, electrical appliances (electrical insulating members for plugs, outlets, breakers, switches, etc.) and the like. Especially among them, conduit, retentioning wire coatings, optical fiber coatings, hoses and like cord-like moldings are desirable as the shaped body of the invention.

2-3) Fastening Member 2-3-1) Kind of Fastening Member

Usually in order to position the shaped body according to the purpose, or to prevent contact with other members or to inhibit dispersing, these moldings are fastened by fastening members or fixing jigs such as screws, bolts, nuts, adhesives, tapes, cords, films, hooks or the like, among which a tape is widely used as a fastening member of molded body because of its convenience.

Fastening members defined in the invention include screws, bolts, nuts, adhesives, tapes, cords, films, binding bands, hooks, clips, etc. There is no limitation on the shape of the fastening members insofar as they are used for the purpose of fixing shaped bodies. Preferred fixing members are adhesive tapes, self-fusing tapes, binding bands, etc. among which adhesive tape and self-fusing tape are more preferred.

When merely a word "tape" is used herein, an adhesive tape or self-fusing tape is meant. A sheet or film having a thickness of about 0.005 to about 2 mm which is flexible or pliable is included in "tape" of the present invention. The shape in the surface direction of tape is not limited and can be any of shapes such as square, rectangle, circle and the like.

For example, an adhesive tape generally comprises a substrate layer and an adhesive layer formed on the surface of the substrate layer. Examples of the substrate are plastic films or plastic sheets formed of polyvinyl chloride, polypropylene, polyethylene, polyester, nylon or the like, paper, cloth and like known substrates. Among them, preferred substrates are those formed of polypropylene, polyester or nylon. Useful adhesives are, for example, adhesives formed of natural rubber, synthetic rubber, acrylic resin and like known adhesive materials. Especially adhesives formed of synthetic rubber, acrylic resin or the like are preferred. The adhesive tape may have a back coat layer when so required.

Self-fusing tapes, for example, are preferably those formed of butyl resin, silicone resin and like material. Preferred examples of screws, bolts, nuts, cords, films, binding bands, hooks and clips are those formed of polypropylene, polyester, nylon and like material. Preferred adhesives are, for example, those formed of polyester, epoxy resin, polyurethane or the like.

2-3-2) Content of Heavy Metal

In the invention, a Zn content in the fastening member is to be 1% by weight or less at least at a portion of the fastening member in contact with the shaped body. In this range, the shaped body can exhibit its inherent properties. The Zn content is preferably 0.5% by weight or less, more preferably 0.1% by weight or less, most preferably 0.05% by weight or less.

In the method of the invention, a Pb content in the fastening member is preferably 0.03% by weight or less at least at a portion of the fastening member in contact with the shaped body. In this range, the degradation of molded body can be avoided and the molded body can exhibit its inherent properties. The Pb content in the fastening member is preferably 0.02% by weight or less, more preferably 0.012% by weight or less.

These elements (Zn, Pb) may be present as a portion of a polymerization catalyst or a stabilizer to be used in preparation of a polymer material constituting the fastening member; impurities. These elements may be contained in colored pigment. These elements are included in the materials for fastening member for various reasons. Consequently the materials for the fastening member to be used in the invention are those prepared in a manner to prevent the contamination of Zn and Pb to the utmost extent.

When an adhesive tape is used as fastening member, necessarily the Zn content is 1% by weight or less in a layer (adhesive layer) of the fastening member in contact with the molded product of polyester resin. In addition, the Zn content is preferably 1% by weight or less throughout the tape. When the Pb content is 0.03% by weight or less in the fastening member, the Pb content is necessarily 0.03% by weight or less at least in a layer (adhesive layer) of the fastening member in contact with the molded product of polyester resin. The Pb content is preferably 0.03% by weight or less throughout the tape.

It is preferred that the Zn and/or Pb content is less than in the specified range throughout the tape as well as in a layer of the tape (adhesive layer) in contact with the molded product of polyester resin. This is because if the portion of the adhesive tape in contact with the molded product of polyester resin is soft, Zn and/or Pb would pass through the soft layer of the tape and reach the molded product of polyester resin, though the Zn content and Pb content are small at a portion of the tape in contact with the molded product.

2-4) Effect

Zn seriously affects the degradation of polyester under a high temperature and high humidity environment. Consequently, when the Zn content of a fastening member is 1% by weight or less according to the first fastening method of the invention, the degradation of shaped body of polyester resin would be reduced for a long time even under a high temperature (80° C. or higher) and high humidity environment or under an environment of water downpour.

Accordingly the polyester resin-containing molded product fixed by the fastening method of the invention exhibits high durability under high temperature and high humidity environments, e.g. in an automobile engine room and inside various mechinery. In addition, the polyester resin-containing shaped body fastened by the fastening method of the invention can show high durability even under a high temperature environment exceeding 100° C. because of the Pb content of 0.03% by weight or less in the fixing means as well as the Zn content in said range.

When material of the shaped body is a thermoplastic polyester elastomer composition, the shaped body can retain the electrical insulating properties for a long time even under unfavorably high temperature and high humidity environments coupled with the high electrical insulating properties of the composition itself.

Second Fastening Method 3-1) Material of Shaped Body 3-1-1) Basic Structure of Material The shaped body which is an object of the second fastening method of the invention is one containing a polyester resin, suitably one containing a thermoplastic polyester elastomer.

3-1-2) Thermoplastic Polyester Elastomer

The thermoplastic polyester elastomer which is used in the shaped body to be fixed is as described in (I), 2).

3-1-3) Rubber-Like Polymer

The shaped body to be fixed in the invention may contain a rubber-like polymer in addition to the thermoplastic polyester elastomer. The amount of the rubber-like polymer to be used is preferably about 1 to about 30 parts by weight per 100 parts by weight of the thermoplastic polyester elastomer. The rubber-like polymer is the same as used in the first fastening method of the invention.

3-1-4) Other Components

Other components are the same as in the first fastening method of the invention.

3-1-5) Process for Preparing the Composition

The process for preparing the composition is the same as in the first fastening method of the invention. 3-2) Shaped Body The shaped body is the same as in the first fastening method of the invention.

3-3) Fastening Member

The kinds of fastening member or fixing jigs, and the structure and materials of adhesive tape are the same as in the first fastening method of the invention.

In the invention, the Pb content in the fastening member is 0.03% by weight or less at least at a portion of the fastening member in contact with the shaped body. In this range, the shaped body can exhibit its inherent properties. The Pb content is preferably 0.02% by weight or less, more preferably 0.012% by weight or less.

In the method of the invention, preferably the Zn content in the fastening member is 1% by weight or less at least at a portion of the fastening member in contact with the shaped body. In this range, the degradation of the shaped body can be avoided and the shaped body can exhibit its inherent properties. The Zn content in the fastening member is preferably 0.5% by weight or less, more preferably 0.1% by weight or less, further more preferably 0.05% by weight or less.

When an adhesive tape is used as a fastening member, the Pb content is necessarily 0.03% by weight or less in a layer (adhesive layer) in contact with the shaped body of polyester resin. In addition, the Pb content is preferably 0.03% by weight or less throughout the tape. When the Zn content is 1% by weight or less in the fastening member, the Zn content is necessarily 1% by weight or less at least in a layer (adhesive layer) in contact with the shaped body of polyester resin, and the Zn content is preferably 1% by weight or less throughout the tape.

3-4) Effect

Especially Pb seriously affects the degradation of polyester resin under a high temperature environment. Consequently, by adjusting the Pb content of fastening member to 0.03% by weight or less according to the second fastening method of the invention, the degradation of shaped body can be reduced for a long time even under a high temperature (higher than 100° C.) environment.

Accordingly the polyester resin-containing shaped body fastened by the fastening method of the invention exhibits high heat resistance under a high temperature (higher than 80° C., especially higher than 100° C.) environment, for example, in an automobile engine room or inside the machinery. In addition, the polyester resin-containing shaped body fastened by the fastening method of the invention can show high durability under a high temperature and high humidity environment and an environment of water downpour by adjustment of Zn content to 1% by weight or less in the fastening member as well as Pb content to said range.

When the material of the shaped body is a thermoplastic polyester elastomer composition, the shaped body can retain the electrical insulating properties for a long time even under high temperature environments coupled with the high electrical insulating properties of the composition itself.

EXAMPLES

The invention will be described below in more detail with reference to the following examples to which, however, the invention is not limited.

Examples 1-1 to 1-5 and Comparative Examples 1-1 and 1-2 (Examples of Production of Electric Wires)

S2002FB X-3 (trade name, product of TOYOBO CO., LTD.) serving as a thermoplastic polyester elastomer (A) and the rubber-like polymer (B) shown in following Table 1 were mixed in the proportions indicated in Table 1 and were melted and kneaded at 240° C. by a twin screw extruder TOSHIBA MACHINE Co., LTD. TEM-35) to give pellets. The component (A) was prepared by kneading a halogen-type flame retardant and a water resistance improver with S2002 (product of TOYOBO CO., LTD., thermoplastic polyester elastomer comprising polybutylene terephthalate as a hard segment and $\epsilon$-caprolactone as a soft segment)

TABLE 1

|  | Proportion of component (A) (i) | Component (B) | Proportion of component (B) |
| --- | --- | --- | --- |
| Ex. 1-1 | 100 wt. parts | Acrylic rubber (ii) | 20 wt. parts |
| Ex. 1-2 | 100 wt. parts | SEBS (iii) | 20 wt. parts |
| Ex. 1-3 | 100 wt. parts | Acid-modified EB (iv) | 20 wt. parts |
| Ex. 1-4 | 100 wt. parts | Acid-modified EB | 10 wt. parts |
| Ex. 1-5 | 100 wt. parts | Acid-modified EB | 5 wt. parts |
| Comp. Ex. 1-1 | 100 wt. parts | — | — |
| Comp. Ex. 1-2 | S2002 alone | — | — |

Note: (i) product of TOYOBO CO., LTD., Pelprene S2002FB X-3

(ii) product of GOODYEAR Chemicals Europe Co., Ltd., SUNIGUM P7395

(iii) product of Asahi Kasei Corporation, Tuftec M1943

(iv) product of Mitsui Chemicals, Inc., TAFMER MA8510

The obtained pellets were extruded as a layer of 0.2 mm thickness around a copper conductive wire to form an electric wire. The conductor, thickness of electrical inslating layer and the outer diameter of whole of the electric wire are as follows.

Conductor: The material was copper.

The number of stranded wire was 7.

The diameter of strand was 0.26 mm.

The outer diameter of each thread was 0.78 mm.

The electrical resistance was 48 mΩ/m.

The thickness of electrical insulating layer was 0.2 mm.

The outer diameter of electric wire was 1.16±0.05 mm.

Evaluation of Electrical Insulating Property

Testing Method

"Hot Water Resistance Test" was carried out according to SAE J1678 (published on March, 1999).

Test Sample

The electric wires produced in Examples 1-1 to 1-5 and Comparative Examples 1-1 and 1-2 were used as test samples. The length of the electric wire sample was 2.5±0.1 m. The electrical insulating layer (electrical insulating cover) was peeled by a distance of 25 mm from both ends of electric wire to provide a test sample.

Apparatus (see FIG. 1)

10 g/l of an aqueous solution of NaCl (85° C.)

Direct power source (48 V)

Mandril having a diameter 5 times the outer diameter of electric wire

Device for measuring the electrical resistance (product of Yokogawa M&C Corporation, 2406)

Procedure

Using a mandril, the central portion of electric wire is rotated three times and the remaining electric wire portion is bundled into a coil. As shown in FIG. 1, the test sample is immersed in an aqueous solution of NaCl (85° C.) in a bath. Both end portions (250 mm in length) of the sample are left outside of the surface of the solution. One end of the wire is connected to the anode or cathode of power source. The cathode or anode not connected to the power source is connected to the electrode, which is immersed in the aqueous solution of NaCl (85° C.) in the bath. A current is charged in this state for 7 days. Thereafter 48-V power source is disconnected and the electrical resistance in the electrical insulating layer is measured [applied voltage: 500V (direct current)/application time: 1 minute].

The insulation volume resistivity is measured by an equation (1).

$$\rho_O = 2.725(1 \times R)/\log(D/d) \quad (1)$$

wherein $\rho_O$ is the insulation volume resistivity (Ω☐mm);

l is the immersed length of the test sample, expressed in mm, in the aqueous solution of NaCl (85° C.);

R is the measured insulation resistance of the coating, expressed in Ω;

D is the outside cable(electric wire) diameter, expressed in mm d is the conductor(the core of the electric wire) diameter, expressed in mm.

The electrical insulating covers produced in the examples of the invention must have a insulation volume resistivity of $10^9$ Ω☐mm or more. The above-mentioned set of operations is taken as one cycle, and the operations are repeated by 5 cycles (total 35 days).

After completion of the test, the test sample is taken out from the bath and is placed at room temperature. The appearance of the sample is observed to determine if at least the core wire is partly exposed in which case the sample is assessed as unacceptable. If the sample has no portion of core wire exposed at all, the sample is subjected to "Withstand Voltage Test".

Withstand Voltage Test

The test sample which completed the "Hot Water Resistance Test" is adjusted to at least a length of 350 mm. The electrical insulating layer (electrical insulating cover) is peeled by a distance of 25 mm from both ends thereof. Then the test sample is immersed in 5% by weight of an aqueous solution of NaCl (at room temperature) for 4 hours. An AC voltage (frequency of 60 Hz) of 1 kV (effective value:rms) is applied between the sample and the aqueous solution of NaCl for one minute. In this case, a sample portion having the electric wire exposed at both ends is laid outside of the aqueous solution of NaCl while a sample portion covered with the electrical insulating layer is immersed in the aqueous solution of NaCl. One end of electric wire in the sample is connected to the cathode or anode in the AC power source, and the anode or cathode in the AC power source is connected to the electrode, which is immersed in the aqueous solution of NaCl. When destruction does not occur in the electrical insulating layer, the sample was acceptable.

Evaluation of Heat Aging Resistance

Using an extruder (product of PLA GIKEN CO., LTD: 30 mm φ single screw extruder), a sheet of 200 μm thickness was molded from each composition prepared in Examples 1-1 to 1-5 and Comparative Examples 1-1 and 1-2. A test piece in the shape of dumbbell No. 1 (JIS K-6251) was punched out from the sheet. The obtained dumbbell-like test piece was left to stand in a hot air oven at 200° C., 170° C. or 150° C. The tensile elongation of the test piece was measured as described below. Then, the time (elongation retention time) required until the tensile elongation reached 125% or less was measured. The time was recognized as an indicator of resistance to thermal aging.

Evaluation of Water Resistance

A dumbbell-like test piece prepared in the same manner as in the evaluation of resistance to thermal aging was left to stand as immersed in boiling water. The tensile elongation of the test piece was measured as described below and the period (elongation retention period) required until the elongation reached 125% or less was measured. The time was recognized as an indicator of water resistance.

Evaluation of Tensile Elongation at Break

The tensile elongation was measured by the following method, which elongation was referred to in the evaluation of resistance to thermal aging and the evaluation of water resistance. After being treated for a specified period of time, the dumbbell-like test piece was stretched at a velocity of 500 mm per min using TENSILON UTM-III (trade name, product of TOYO SEIKI Co., Ltd.), whereby the length of a piece portion stretched until the test piece became broken was measured. A ratio of stretched length(L1) to the original length(L0) of the piece before stretching ((L1−L0)/L0) was taken tensile elongation at break (%).

The evaluation results of electrical insulating property, resistance to thermal aging and water resistance are shown in Table 2.

TABLE 2

|  | Electrical insulating Property | Resistance to thermal aging (Ductility retention period: hr) | | | Water resistance (Ductility retention period: hr) |
| --- | --- | --- | --- | --- | --- |
|  |  | 200° C. | 170° C.☐☐ | 150° C.☐☐ | 100° C. |
| Ex. 1 | Acceptable | — | 1200 | — | >350 |
| Ex. 2 | Acceptable | — | 1020 | — | >350 |
| Ex. 3 | Acceptable | 250 | 1100 | 2950 | >350 |

TABLE 2-continued

|  | Electrical insulating Property | Resistance to thermal aging (Ductility retention period: hr) | | | Water resistance (Ductility retention period: hr) |
|---|---|---|---|---|---|
|  |  | 200° C. | 170° C. | 150° C. | 100° C. |
| Ex. 4 | Acceptable | 260 | 1150 | 3020 | >350 |
| Ex. 5 | Acceptable | 280 | 1150 | 3110 | >350 |
| Comp. Ex. 1 | Unacceptable | 300 | 1200 | 3200 | >350 |
| Comp. Ex. 2 | Unacceptable | 300 | 1200 | 3200 | 200 |

As apparent from Table 2, the composition containing the rubber-like polymer as well as the thermoplastic polyester elastomer (Examples) can retain the electrical insulating property for a long time in the water resistance and dielectric strength tests compared with a case of using a thermoplastic polyester elastomer alone (Comparative Examples). The compositions of the invention prepared in Examples did not significantly reduce the heat resistance and water resistance of thermoplastic polyester elastomer.

Examples 2-1 to 2-3 and Comparative Examples 2-1 and 2-2

Using an injection molding machine (model -SAV, product of SANJO SEIKI CO., LTD.), a flat plate (100 mm×100 mm×2 mm) was molded from chips of thermoplastic polyester elastomer (registered trademark Pelprene S2004FS, product of TOYOBO CO., LTD.). A test piece in the shape of dumbbell No. 1 (JIS K-6251) was punched out from the plate. A shaped body of polyester resin fixed by the fastening member was produced as a sample by winding a tape (fastening member) on the surface of the test piece. The tape used in Examples 1 and 2 was commercially available polyvinyl chloride adhesive tape. The tape used in Example 3 was commercially available polyester adhesive tape (NITTO No.31, thickness 25 μm). The tape used in Comparative Example 1 was commercially available adhesive cloth tape (tesa 4649, product of TESA TAPE, INC.). The tape used in Comparative Example 2 was commercially available polyester adhesive tape (tesa 51006, product of TESA TAPE, INC.).

Evaluation of Degradation

The samples prepared in Examples 2-1 to 2-3 and Comparative Examples 2-1 and 2-2 were subjected to water resistance test Each sample was left to stand as immersed in hot water at 80° C. for 2000 hours.

After standing in hot water, each sample was withdrawn from the hot water and cooled to room temperature. The tape was removed and the test piece was wound around a rod having circular section of 10 mm in diameter. Then, it was confirmed by visual inspection whether cracks occurred on the surface of the test piece. When cracks occurred on the surface of the test piece, the test piece was regarded as degraded.

Metal Content

The content of metal in the entire layer of each tape used as the fastening member in Examples 2-1 to 2-3 and Comparative Examples 2-1 and 2-2 was measured using a X-ray fluorescence spectrometer (product of Rigaku Corporation, System 3270 type), and was calculated according to a fundamental parameter method. The measuring conditions are as follows.

Name of Apparatus: product of Rigaku Corporation, System 3270 type

X-ray tube: Rh (rhodium)

X-ray output: 50 KV×50 mA

X-ray irradiation area: diameter 30 mm

Thickness of sample: about 5 mm (tape superimposed to about 5 mm thickness)

Rotation of sample: Rotated

State of sample: It is supposed that the matrix and the objective element exist uniformly in the sample.

Calculation of concentration: The concentration (wt. %) is calculated from the intensity of element obtained by the measurement according to a fundamental parameter method. The metal residue in the sample is supposed to be entirely carbon.

Table 3 shows the evaluation results of water resistance of test pieces used in the test and the contents of metal components obtained by X-ray fluorescent analysis. The limit of measurement in Examples was 5 ppm.

Since an adhesive tape was used in these Examples, the Pb content and the Zn content throughout the tape were measured by X-ray fluorescent analysis method. In the case of other fastening members, the metal content can be measured by sampling a portion of the fastening member in contact with the shaped body of polyester resin. Other measurement methods than X-ray fluorescent analysis method can be employed and include, for example, atomic absorption analysis method, inductively coupled plasma-optical emission analytical spectrometry(ICP) method, ICP-MS method and like known methods.

TABLE 3

|  | Ex. 2-1 | Ex. 2-2 | Ex. 2-3 | Comp. Ex. 2-1 | Comp. Ex. 2-2 |
|---|---|---|---|---|---|
| Evaluation of water resistance | A | A | A | B | B |
| Temp. of hot water | 80° C. | | | | |
| Metal content | | | | | |
| Zn | 0.07 | 0.026 | ND | 3.4 | 2.6 |
| Pb (wt. %) | 0.03 | 0.015 | ND | ND | ND |

Note: A: No crack B: Cracked ND = Not detected

As apparent from Table 3, even after immersion in hot water at 80° C. for 2000 hours, no degradation were observed in the samples of Examples 2-1, 2-2 and 2-3 using fastening members containing 1% by weight or less of Zn for fixing the shaped bodies of thermoplastic polyester elastomer. On the other hand, degradation was seen in the samples of Comparative Examples 2-1 and 2-2 wherein the Zn content was more than 1% by weight although the Pb content was less than the limit of detection.

These results show that when a shaped body produced from a material containing a polyester resin is fixed by a fastening member having the Zn content of 1% by weight or less, the shaped body can retain its inherent properties.

Examples 2-4, 2-5, 2-6 and 2-7

Use was made of pellets obtained by melting and kneading, in a twin screw extruder at 240° C., 100 parts by weight of a thermoplastic polyester elastomer (registered trademark Pelprene S2002FB X-3, product of TOYOBO CO., LTD.) and 10 parts by weight of a rubber-like polymer (TAFMER MA8510) which was acid-modified EB (product of Mitsui Chemicals, Inc.) instead of chips of Pelprene S2004FS (registered trademark) used in Examples 2-1 to 2-3.

The tape used in Examples 2-4 and 2-5 was commercially available polyvinyl chloride adhesive tape (the same as used in Examples 2-1 and 2-2). The tape used in Example 2-6 was commercially available polyester adhesive tape (NITTO No.31, thickness 25 μm, the same as used in Example 2-3). The tape used in Example 2-7 was commercially available polyvinyl chloride adhesive tape. Under other conditions which were the same as in Examples 2-1 to 2-3, test pieces and samples were prepared.

Evaluation of Degradation

Four samples were prepared in each of Examples. One of them was immersed in hot water at 80° C. for 2000 hours, while three other samples were left to stand in a hot air oven at 120° C., 140° C. and 150° C., respectively for 2000 hours. The subsequent procedure was carried out in the same manner as in Examples 2-1 to 2-3. Thereafter it was confirmed by visual inspection whether cracks occurred on the surface of the test pieces. The results are shown in Table 4.

TABLE 4

|  | Example 2-4 | Example 2-5 | Example 2-6 | Example 2-7 |
| --- | --- | --- | --- | --- |
| Resistance to thermal aging |  |  |  |  |
| 150° C. | C | C | A | D |
| 140° C. | C | B | A | D |
| 120° C. | B | A | A | D |
| Water resistance |  |  |  |  |
| 80° C. | A | A | A | A |
| Metal content (wt. %) |  |  |  |  |
| Zn | 0.07 | 0.026 | ND | 0.08 |
| Pb | 0.03 | 0.015 | ND | 0.05 |

Note: A: No crack, scarcely discolored
B: No crack, but discolored
C: Slightly cracked
D: Cracked
ND: Not detected As evident from Table 4, when a tape formed of a material containing 1% by weight or less of Zn was used for fixing the test piece comprising a thermoplastic polyester elastomer and a rubber-like polymer, the test piece did not crack or discolor even if left to stand in hot water at 80° C. for 2000 hours. Even when the test piece was heat-treated at 120 to 150° C., cracks scarcely developed in the test piece because of using a tape having a Zn content of 1% by weight or less. This clarified that when a fastening member having a Zn content of 1% by weight or less is used for fixing a shaped body consisting of a material comprising a thermoplastic polyester elastomer and a rubber-like polymer, the shaped body can retain its inherent properties. In addition, as a Zn content in a fastening member is reduced, the shaped body can withstand exposure to a high temperature to a more extent.

Examples 3-1 to 3-3 and Comparative Example 3-1

Using an injection molding machine (model -SAV, product of SANJO SEIKI CO., LTD.), a flat plate (100 mm×100 mm×2 mm) was molded from chips of a thermoplastic polyester elastomer (registered trademark Pelprene S2004FS, product of TOYOBO CO., LTD.). A test piece in the shape of dumbbell No.1 (JIS K-6251) was punched out from the plate. A shaped body of polyester resin fixed by a fastening member was produced as a sample by winding a tape (fastening member) around the surface of the test piece. The tape used in Examples 3-1 and 3-2 was commercially available polyvinyl chloride adhesive tape. The tape used in Example 3-3 was commercially available polyester adhesive tape (NITTO No. 31, thickness 25 μm). The tape used in Comparative Example 3-1 was commercially available vinyl chloride adhesive tape.

Evaluation of Degradation

The samples prepared in Examples 3-1 to 3-3 and Comparative Example 3-1 were subjected to thermal aging resistance test□ Three samples were provided in each of Examples. The three samples were left to stand in a hot air oven at 150° C., 140° C. and 120° C., respectively for 2000 hours.

After hot air treatment, each sample was withdrawn from the hot air drier and cooled to room temperature. The tape was removed and the test piece was wound around a rod having circular section of 10 mm in diameter. Then, it was confirmed by visual inspection whether cracks occurred on the surface of the test piece. When cracks occurred on the surface of the test piece, the test piece was regarded as degraded. It was also confirmed by visual inspection whether a portion of test piece which had been previously wound by the tape was discolored.

Metal Content

The metal content was measured by the method described above.

Table 5 shows the results of thermal aging resistance evaluation and measurement of metal content.

TABLE 5

|  | Example 3-1 | Example 3-2 | Example 3-3 | Comp. Ex. 3-1 |
| --- | --- | --- | --- | --- |
| Resistance to Thermal aging Temp. of hot air |  |  |  |  |
| 150° C. | C | C | A | D |
| 140° C. | C | B | A | D |
| 120° C. | B | A | A | D |
| Metal content (wt. %) |  |  |  |  |
| Zn | 0.07 | 0.026 | ND | 0.08 |
| Pb | 0.03 | 0.015 | ND | 0.05 |

Note: A: No crack, scarcely discolored
B: No crack, but discolored
C: Slightly cracked
D: Cracked
ND: Not detected As evident from Table 5, when a material of a fastening member having a Pb content of 0.03% by weight or less was used for a shaped body of thermoplastic polyester resin in Examples 3-1 to 3-3, the samples did not degrade even if left to stand in hot air at 120 to 150° C. for 2000 hours. On the other hand, the sample of Comparative Example 3-1 was degraded because of Pb content of more than 0.03% by weight despite Zn content of 1% by weight or less.

This showed that when a shaped body formed from a material containing a thermoplastic polyester resin is fastened by a fastening member having a Pb content of 0.03% by weight or less, the shaped body can retain its inherent properties.

After the treatment, each sample was withdrawn from the drier or the hot water, and cooled to room temperature. The tape was removed and the test piece was wound around a rod having circular section of 10 mm in diameter. Then, it was confirmed by visual inspection whether cracks occurred on the surface of the test pieces. The test piece having cracks on one surface was regarded as degraded. It was confirmed by visual inspection whether a portion of test piece had been previously wound by the tape was discolored.

Metal Content

The metal content was measured by the method described above.

Table 6 shows the results of thermal aging resistance evaluation and measurement of metal content.

TABLE 6

|  | Example 4-1 | Example 4-2 | Example 4-3 | Comp. Ex 4-1 | Example 4-4 | Example 4-5 |
|---|---|---|---|---|---|---|
| Evaluation of thermal aging resistance Temp. of hot air |  |  |  |  |  |  |
| 150° C. | C | C | A | D | C | C |
| 140° C. | C | B | A | D | B | B |
| 120° C. | B | A | A | D | A | A |
| Metal content (wt. %) |  |  |  |  |  |  |
| Zn | 0.07 | 0.026 | ND | 0.08 | 3.4 | 2.6 |
| Pb | 0.03 | 0.015 | ND | 0.05 | ND | ND |

Note: A: No crack, scarcely discolored
B: No crack, but discolored
C: Slightly cracked
D: Cracked
ND: Not Detected Examples 4-1 to 4-3 and Comparative Examples 4-1 and 4-2

A flat plate (100 mm×100 mm×2 mm) was molded from the pellets prepared in Example 1-5. A test piece in the shape of dumbbell No. 1 (JIS K-6251) was punched out from the plate. A shaped body of polyester resin fixed by a fastening member was produced as a sample by winding a tape (fastening member) around the surface of the test piece. The tape used in Examples 4-1 and 4-2 was commercially available polyvinyl chloride adhesive tape. The tape used in Example 4-3 was commercially available polyester adhesive tape (NITTO No.31, thickness 25 µm). The tape used in Comparative Example 4-1 was commercially available adhesive cloth tape (tesa 4649, product of TESA TAPE, INC.).

Examples 4-4 and 4-5

Test pieces and samples were prepared in the same manner as in Examples 4-1 to 4-3 using the pellets prepared in Example 1-3.

Evaluation of Degradation

The samples prepared in Examples 4-1 to 4-5 and Comparative Example 4-1 were subjected to thermal aging resistance test and water resistance test□ Three samples were provided in each of Examples. The three samples were left to stand in a desiccant dryer at 150° C., 140° C. and 120° C., respectively for 2000 hours.

As evident from Table 6, when a fastening member containing 0.03% by weight or less of Pb was used for fixing a shaped body formed of a material containing a thermoplastic polyester resin and a rubber-like polymer in Examples 4-1 to 4-5, the sample did not degrade even if left to stand even in hot air at 120° C. for 2000 hours. Degradation scarcely occurred even in hot air at 140 or 150° C. On the other hand, the sample of Comparative Example 4-1 was degraded because of Pb content of more than 0.03% by weight despite Zn content of 1% by weight or less.

This showed that when a shaped body formed from a material containing a thermoplastic polyester elastomer and a rubber-like polymer is fixed by a fastening member having a Pb content of 0.03% by weight or less, the shaped body can retain its inherent properties.

It is apparent from the results of Examples 4-4 and 4-5 that when the Pb content is very small (not detected) despite a Zn content is big, the shaped body of thermoplastic polyester elastomer shows excellent resistance to thermal aging.

INDUSTRIAL APPLICABILITY

The electrical insulating material containing a thermoplastic polyester elastomer according to the invention can be suitably used as a material for a shaped body such as electrical insulating covers. The electrical insulating cover is useful as coatings on electric wires, coating materials for plugs, outlets or terminals, molding products as breakers, switches, electric appliances and apparatus, etc. which are used for electrical insulation. The coatings on electric wires are used as electrical insulating cover for insulated electric wires such as internal wirings of electronic equipment, automobiles or the like.

The fastening method and fastening member of fastening a shaped body of polyester resin according to the invention can be suitably utilized for fixing a shaped body such as conduit coated by a shaped body of polyester resin, retentioning wires, optical fibers, hoses and like cord-like moldings, sheets which are molded products of polyester resin, containers, electrical insulating members in electrical appliances (coating materials for plugs, outlets, terminals; breakers; switches, etc.) and the like.

What is claimed is:

1. An electrical insulating material consisting essentially of:
   a mixture of
   (A) 100 parts by weight of a thermoplastic polyester elastomer; and
   (B) 1 to 30 parts by weight of at least one polymer selected from the group consisting of styrene-butadiene copolymer rubbers, acrylic rubbers, and maleic acid-modified thermoplastic polyolefin elastomers.

2. The electrical insulating material according to claim 1, wherein the thermoplastic polyester elastomer (A) is a polyester-type block copolymer consisting of a crystalline aromatic polyester segment and a polylactone segment.

3. The electrical insulating material according to claim 2, wherein the thermoplastic polyester elastomer (A) contains 20 to 40% by weight of the polylactone segment.

4. An electrical insulating cover consisting essentially of:
   a mixture of
   (A) 100 parts by weight of a thermoplastic polyester elastomer; and
   (B) 1 to 30 parts by weight of at least one polymer selected from the group consisting of styrene-butadiene copolymer rubbers, acrylic rubbers, and maleic acid-modified thermoplastic polyolefin elastomers.

5. The electrical insulating cover according to claim 4, wherein the thermoplastic polyester elastomer (A) is a polyester-type block copolymer consisting of a crystalline aromatic polyester segment and a polylactone segment.

6. The electrical insulating cover according to claim 5, wherein the thermoplastic polyester elastomer (A) contains 20 to 40% by weight of the polylactone segment.

7. A method of electrical insulation using a shaped body consisting essentially of:
   a mixture of
   (A) 100 parts by weight of a thermoplastic polyester elastomer; and
   (B) 1 to 30 parts by weight of at least one polymer selected from the group consisting of styrene-butadiene copolymer rubbers, acrylic rubbers, and maleic acid-modified thermoplastic polyolefin elastomers.

8. The method according to claim 7, wherein the thermoplastic polyester elastomer (A) is a polyester-type block copolymer consisting of a crystalline aromatic polyester segment and a polylactone segment.

9. The method according to claim 8, wherein the thermoplastic polyester elastomer (A) contains 20 to 40% by weight of the polylactone segment.

10. An electrical insulating material consisting essentially of:
    a mixture of
    (A) 100 parts by weight of a thermoplastic polyester elastomer;
    (B) 1 to 30 parts by weight of at least one polymer selected from the group consisting of styrene-butadiene copolymer rubbers, acrylic rubbers, and maleic acid-modified thermoplastic polyolefin elastomers; and
    (C) at least one member selected from the group consisting of crystallization accelerators, crystal nucleus materials, antioxidants, UV absorbents, plasticizers, lubricants, antistatic agents, electrical conductivity improvers, hydrolysis resistance improvers, impact resistance improvers, metal degradation inhibitors, and coloring agents.

11. An electrical insulating cover consisting essentially of:
    a mixture of
    (A) 100 parts by weight of a thermoplastic polyester elastomer;
    (B) 1 to 30 parts by weight of at least one polymer selected from the group consisting of styrene-butadiene copolymer rubbers, acrylic rubbers, and maleic acid-modified thermoplastic polyolefin elastomers; and
    (C) at least one member selected from the group consisting of crystallization accelerators, crystal nucleus materials, antioxidants, UV absorbents, plasticizers, lubricants, antistatic agents, electrical conductivity improvers, hydrolysis resistance improvers, resistance improvers, metal degradation inhibitors, and coloring agents.

12. A method of electrical insulation using a shaped body consisting essentially of:
    a mixture of
    (A) 100 parts by weight of a thermoplastic polyester elastomer;
    (B) 1 to 30 parts by weight of at least one polymer selected from the group consisting of styrene-butadiene copolymer rubbers, acrylic rubbers, and maleic acid-modified thermoplastic polyolefin elastomers; and
    (C) at least one member selected from the group consisting of crystallization accelerators, crystal nucleus materials, antioxidants, UV absorbents, plasticizers, lubricants, antistatic agents, electrical conductivity improvers, hydrolysis resistance improvers, impact resistance improvers, metal degradation inhibitors, and coloring agents.

* * * * *